US011004226B2

(12) United States Patent
Tsurumi

(10) Patent No.: US 11,004,226 B2
(45) Date of Patent: May 11, 2021

(54) IMAGE PROCESSING DEVICE, IMAGE PROCESSING METHOD, AND IMAGE DISPLAY SYSTEM FOR GRASPING A DISTANCE FROM AN OBSTACLE WITH A SMALLER VISUAL LINE SHIFT

(71) Applicant: Sony Corporation, Tokyo (JP)

(72) Inventor: Shingo Tsurumi, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/642,386

(22) PCT Filed: Aug. 28, 2018

(86) PCT No.: PCT/JP2018/031659
§ 371 (c)(1),
(2) Date: Feb. 27, 2020

(87) PCT Pub. No.: WO2019/049709
PCT Pub. Date: Mar. 14, 2019

(65) Prior Publication Data
US 2020/0193626 A1    Jun. 18, 2020

(30) Foreign Application Priority Data
Sep. 7, 2017   (JP) .............................. JP2017-171799

(51) Int. Cl.
*G06T 7/593* (2017.01)
*B60R 1/00* (2006.01)
(Continued)

(52) U.S. Cl.
CPC ................ *G06T 7/593* (2017.01); *B60R 1/00* (2013.01); *G06T 17/00* (2013.01); *H04N 7/18* (2013.01);
(Continued)

(58) Field of Classification Search
CPC combination set(s) only.
See application file for complete search history.

(56) References Cited

U.S. PATENT DOCUMENTS

| 9,592,852 | B2* | 3/2017 | Kiyokawa | .......... B62D 15/0285 |
| 2007/0003162 | A1* | 1/2007 | Miyoshi | ................. G08G 1/167 |
| | | | | 382/276 |
| 2012/0072050 | A1* | 3/2012 | Naka | ................. B60W 30/0956 |
| | | | | 701/1 |

FOREIGN PATENT DOCUMENTS

| JP | 2000-071877 A | 3/2000 |
| JP | 2005-135037 A | 5/2005 |

(Continued)

OTHER PUBLICATIONS

International Search Report and Written Opinion dated Nov. 13, 2018 for PCT/JP2018/031659 filed on Aug. 28, 2018, 10 pages including English Translation of the International Search Report.

*Primary Examiner* — Zhubing Ren
(74) *Attorney, Agent, or Firm* — Xsensus, LLP

(57) ABSTRACT

A stereo image capturing device captures a stereo image with a measurement target range in front of a vehicle as an angle of field, and a display device is disposed so as to cover at least part of the measurement target range as seen from the viewpoint position of a driver inside the vehicle. Then a distance measuring section measures the distances to another object in the measurement target range using the stereo image and identifies the object within a predetermined distance as an obstacle, and an image generating section generates a virtual mirror image that allows at least the vehicle and the obstacle to be seen using a reflection by a mirror in a case where the mirror is assumed to be virtually disposed above a location at which the obstacle is seen from the viewpoint position of the driver in the vehicle, and causes the display device to display the virtual mirror image.

(Continued)

The present technology can be applied, for example, to in-vehicle image display systems.

14 Claims, 9 Drawing Sheets

(51) Int. Cl.
*G06T 17/00* (2006.01)
*H04N 7/18* (2006.01)

(52) U.S. Cl.
CPC ..... *B60R 2300/107* (2013.01); *B60R 2300/20* (2013.01); *B60R 2300/307* (2013.01); *B60R 2300/8093* (2013.01); *G06T 2207/10012* (2013.01); *G06T 2207/30261* (2013.01)

(56) References Cited

FOREIGN PATENT DOCUMENTS

| | | | |
|---|---|---|---|
| JP | 2006-248384 | A | 9/2006 |
| JP | 2014-198531 | A | 10/2014 |
| JP | 2015-120395 | A | 7/2015 |
| JP | 2016-012277 | A | 1/2016 |
| JP | 2017-037634 | A | 2/2017 |
| JP | 2017-052364 | A | 3/2017 |
| JP | 2017-119485 | A | 7/2017 |

\* cited by examiner

FIG.3
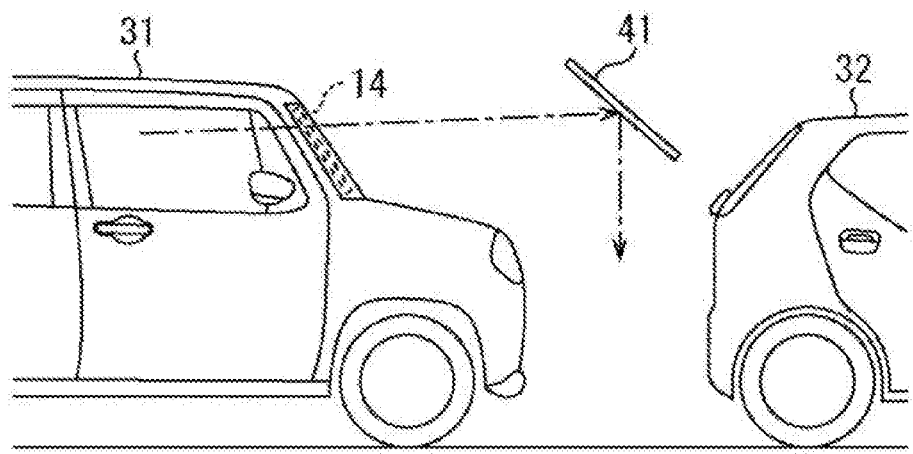
A
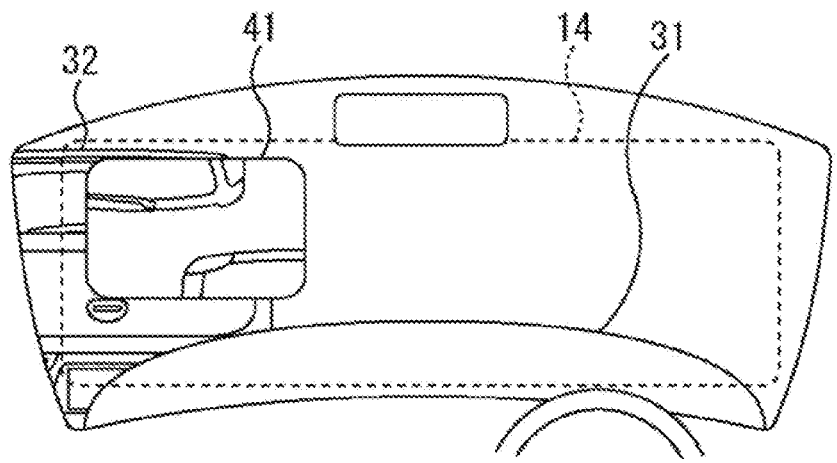
B

FIG.8
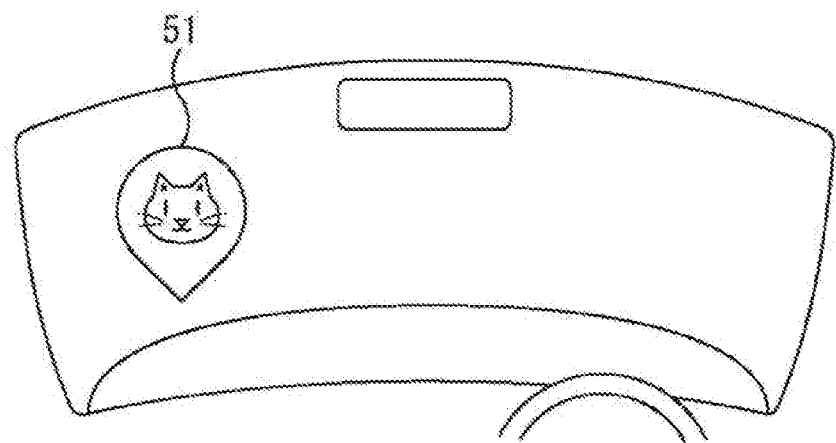
A
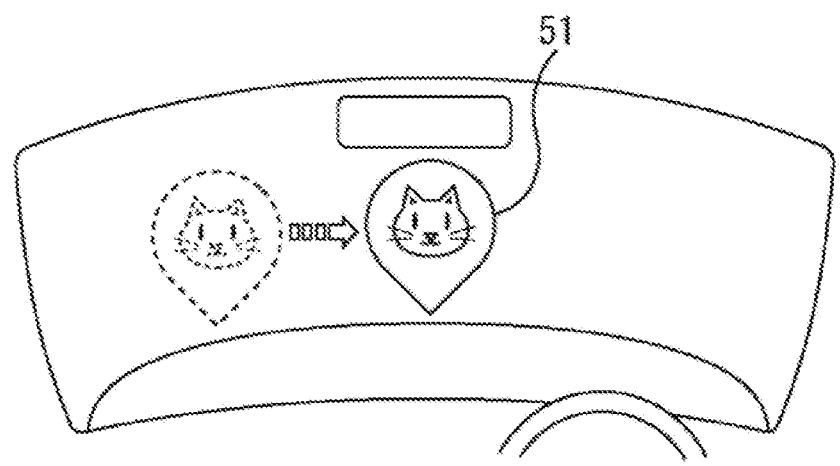
B

IMAGE PROCESSING DEVICE, IMAGE PROCESSING METHOD, AND IMAGE DISPLAY SYSTEM FOR GRASPING A DISTANCE FROM AN OBSTACLE WITH A SMALLER VISUAL LINE SHIFT

CROSS-REFERENCE TO RELATED APPLICATIONS

The present application is based on PCT filing PCT/JP2018/031659, filed Aug. 28, 2018, which claims priority to JP 2017-171799, filed Sep. 7, 2017, the entire contents of each are incorporated herein by reference.

TECHNICAL FIELD

The present disclosure relates to an image processing device, an image processing method, and an image display system, and in particular, to an image processing device, an image processing method, and an image display system that enables a distance from an obstacle to be grasped with a smaller visual line shift.

BACKGROUND ART

In general, an invisible area (hereinafter referred to as a blind spot) is generated for a driver who drives a vehicle because the visual line is blocked by the hood of the vehicle or the like, and therefore it is difficult to grasp the distances from obstacles such as other cars in the blind spot. In the past, various methods (see FIG. 4B and FIG. 4C to be described later) have been developed so that a driver can recognize obstacles in such a blind spot.

For example, PTL 1 proposes a method of creating an output image that resembles a reflected image in the rearview mirror using an image outside the vehicle on the basis of the detection result of the position of the driver's viewpoint.

CITATION LIST

Patent Literature

[PTL 1]
JP 2014-198531A

SUMMARY

Technical Problem

Incidentally, in the existing method as described above, since it is necessary to take the gaze away from the obstacle to be noted, or it is difficult to grasp the distance between the own vehicle and the obstacle, a method that enables the distance from the obstacle to be grasped with a smaller visual line shift has been demanded.

The present disclosure is made in view of such a situation, and makes it possible to grasp a distance from an obstacle with a smaller visual line shift.

Solution to Problem

An image processing device according to an aspect of the present disclosure is provided with a distance measuring section that measures a distance from a predetermined moving object to another object in a measurement target range and identifies the another object within a predetermined distance as an obstacle, and an image generating section that generates a virtual mirror image such that at least the moving object and the obstacle are visible by reflection of a mirror, assuming that the mirror is virtually disposed above a location of the obstacle viewed from a predetermined viewpoint position in the moving object and causes a display device arranged to cover at least a part of the measurement target range as viewed from the viewpoint position to display the virtual mirror image.

An image processing method according to an aspect of the present disclosure includes, for an image processing device for processing an image, measuring a distance from a predetermined moving object to another object in a measurement target range so as to identify the another object within a predetermined distance as an obstacle, and generating a virtual mirror image such that at least the moving object and the obstacle are visible by reflection of a mirror, assuming that the mirror is virtually arranged above a location of the obstacle viewed from a predetermined viewpoint position in the moving object, and causing a display device arranged to cover at least a part of the measurement target range as viewed from the viewpoint position to display the virtual mirror image.

An image display system according to an aspect of the present disclosure is provided with a stereo image capturing device that captures a stereo image with a measurement target range from a predetermined moving object as an angle of view, a display device arranged to cover at least a part of the measurement target range as viewed from a predetermined viewpoint position in the moving object, a distance measuring section that measures a distance to another object in the measurement target range by using the stereo image, and identifies the another object within a predetermined distance as an obstacle, and an image generating section that generates a virtual mirror image such that at least the moving object and the obstacle are visible by reflection of a mirror, assuming that the mirror is virtually arranged above a location of the obstacle viewed from the predetermined viewpoint position in the moving object and causes the display device to display the virtual mirror image.

In one aspect of the present disclosure, the distance from a predetermined moving object to another object in a measurement target range is measured, and the another object within a predetermined distance is identified as an obstacle. Then, a virtual mirror image is generated such that at least the moving object and the obstacle can be seen with reflection from a mirror, assuming that the mirror is virtually placed above the location of the obstacle as viewed from a predetermined viewpoint position in the moving object, and displayed on a display device arranged to cover at least a part of the measurement target range as viewed from the viewpoint position.

Advantageous Effect of Invention

According to one aspect of the present disclosure, the distance from an obstacle can be grasped with a smaller visual line shift.

Note that the effect of the present disclosure is not necessarily limited to those described here, and may be any of the effects described in the present disclosure.

BRIEF DESCRIPTION OF DRAWINGS

FIG. 3 depicts diagrams for explaining a virtual mirror.

FIG. 8 depicts diagrams for explaining a display example of an icon image.

DESCRIPTION OF EMBODIMENT

Hereinafter, a specific embodiment to which the present technology is applied will be described in detail with reference to the drawings.

<Configuration Example of In-vehicle Image Display System>

Figure 1:
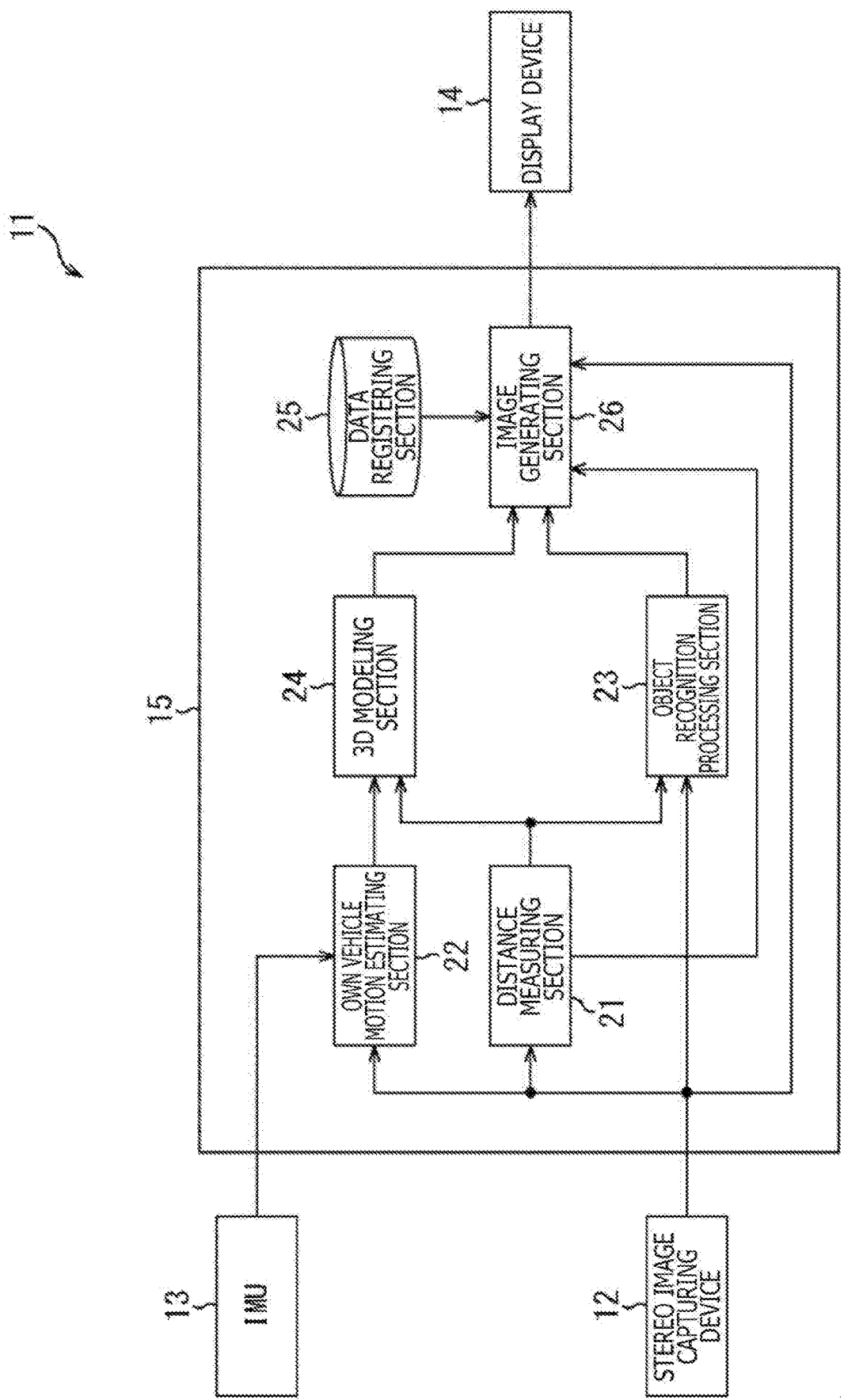
FIG. 1 is a block diagram illustrating a configuration example of an embodiment of an in-vehicle image display system to which the present technology is applied.

FIG. 1 is a block diagram illustrating a configuration example of an embodiment of an in-vehicle image display system to which the present technology is applied.

Figure 2:
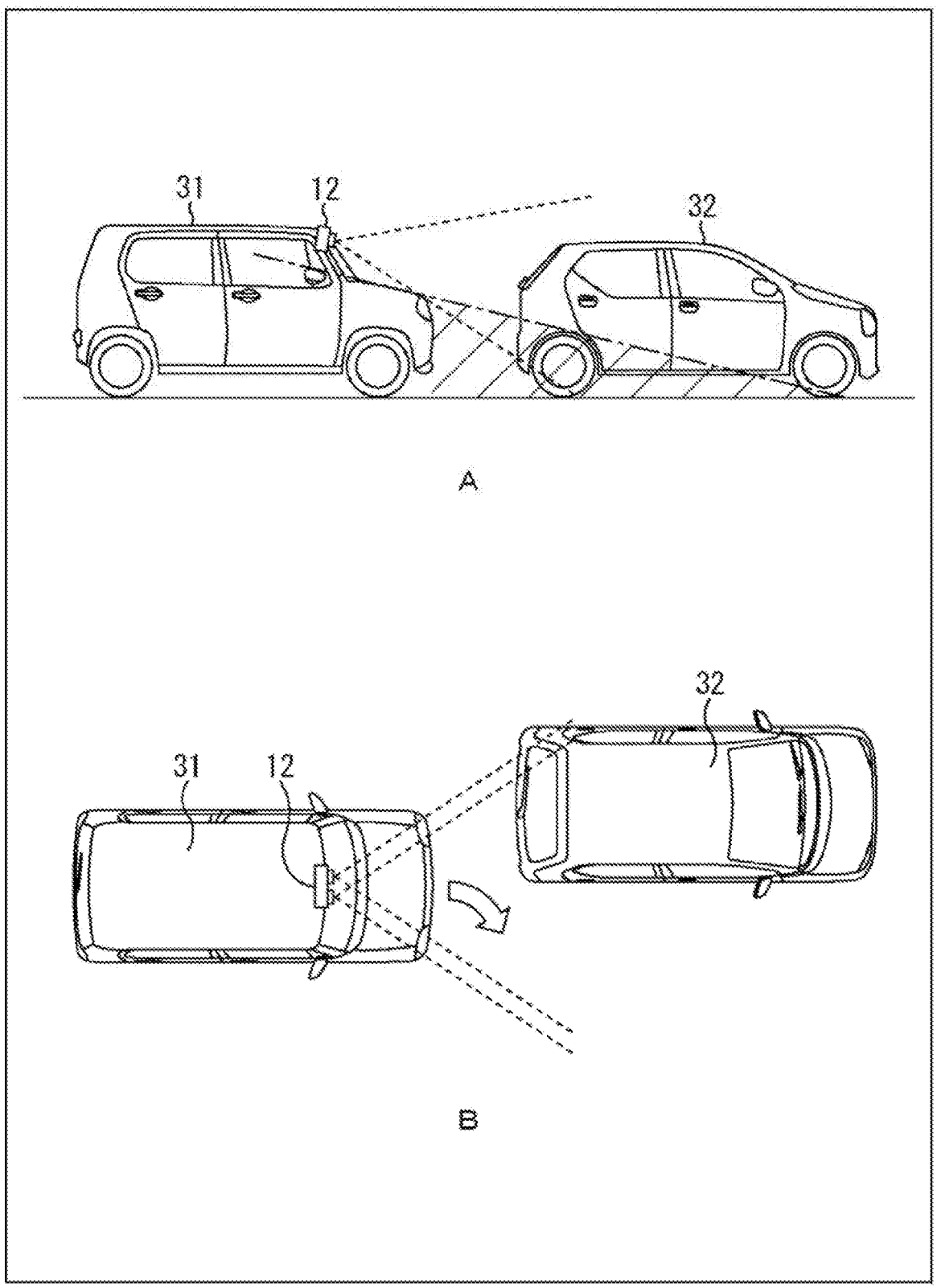
FIG. 2 depicts diagrams illustrating a positional relationship between a vehicle equipped with the image display system and a stopped vehicle.

An image display system 11 illustrated in FIG. 1 includes a stereo image capturing device 12, an IMU (Inertial Measurement Unit) 13, a display device 14, and an image processing device 15, and is mounted on a vehicle 31, for example, to be described later as illustrated in FIG. 2.

As illustrated in FIG. 2 to be described later, the stereo image capturing device 12 is arranged at an arrangement position near the upper end of the windshield of the vehicle 31, that is, at an arrangement position on the back side of the rearview mirror, for example, and is fixed to capture images in front of the vehicle 31 from the arrangement position. In the image display system 11, a range of the image captured by the stereo image capturing device 12 is regarded as a measurement target range that is a target of measurement with respect to the surrounding environment of the vehicle 31, and, for example, the range included in the angle of view of the image capturing section possessed by the stereo image capturing device 12 viewing forward at the center of the vehicle 31 is regarded as the measurement target range.

For example, the stereo image capturing device 12 includes at least two image capturing sections, and these image capturing sections are arranged to have an appropriate distance for obtaining a parallax for measuring a distance to an object that is the object of image capturing. Then, the stereo image capturing device 12 supplies the image processing device 15 with a stereo image in the measurement target range, which is captured in accordance with the angle of view of the two image capturing sections.

The IMU 13 includes a gyro device and an acceleration measurement device, for example, and is an inertia measurement device that measures the inertia of the vehicle 31 on which the image display system 11 is mounted. For example, the IMU 13 can detect a triaxial angle or angular velocity and triaxial acceleration, and supplies observation data obtained by observing these to the image processing device 15. Note that the image display system 11 may use observation data from the IMU 13, and may use, for example, vehicle speed pulses and yaw rates output from various sensors included in the vehicle 31.

The display device 14 includes a head-up display that is transparent when an image is not displayed, and does not block the driver's visual line, for example, and the display area is arranged to cover the windshield of the vehicle 31 as illustrated in FIG. 3. In other words, it is sufficient if the display area of the display device 14 is arranged so as to cover at least a part of the measurement target range (in front of the vehicle 31) by the stereo image capturing device 12 as viewed from the driver sitting in the driver's seat of the vehicle 31. Then, the display device 14 displays an image that has been subjected to image processing by the image processing device 15, that is, for example, displays an image that enables a blind spot to be recognized with a virtual mirror 41 illustrated in FIG. 3 to be described later (hereinafter referred to as a virtual mirror image).

For example, the image processing device 15 generates a virtual mirror image that seems like an image reflected by the virtual mirror 41 (FIG. 3) virtually disposed above the blind spot and performs image processing for causing the display device 14 to display the image such that the driver can recognize the blind spot due to the hood of the vehicle 31 or the like. Here, the virtual mirror image is an image that serves so that at least the vehicle 31 and the obstacle can be seen by reflection on the virtual mirror 41 when the virtual mirror 41 is viewed from the viewpoint position of the driver, and the distance between these two can be intuitively recognized (in a similar manner as when viewed with a normal mirror).

As illustrated in the figure, the image processing device 15 includes a distance measuring section 21, an own vehicle motion estimating section 22, an object recognition processing section 23, a 3D (Dimensions) modeling section 24, a data registering section 25, and an image generating section 26.

The distance measuring section 21 uses a stereo image supplied from the stereo image capturing device 12, and, for example, measures the distance to an object whose image is captured in the stereo image on the basis of the parallax between two images captured by the two image capturing sections. Then, the distance measuring section 21 measures the distance to the object in the surrounding environment in the measurement target range of the stereo image capturing device 12, and supplies the distance information indicating the measurement result to the object recognition processing section 23 and the 3D modeling section 24. Further, the distance measuring section 21 identifies an object within a predetermined distance in the measurement target range as an obstacle, and supplies the image generating section 26 with the position information indicating the position of the obstacle and distance information indicating the distance to the obstacle.

The own vehicle motion estimating section 22 estimates the motion of the vehicle 31 on which the image display system 11 is mounted on the basis of stereo images supplied from the stereo image capturing device 12 and the observation data supplied from the IMU 13. For example, the own vehicle motion estimating section 22 estimates motion such as the traveling speed, acceleration, and traveling direction of the vehicle 31 and supplies motion information indicating the estimation result to the 3D modeling section 24.

The object recognition processing section 23 recognizes an object in the surrounding environment of the vehicle 31 on the basis of stereo images supplied from the stereo image capturing device 12 and distance information supplied from the distance measuring section 21, and supplies an object recognition information indicating the recognition result to the image generating section 26. For example, the object recognition processing section 23 can recognize an object by matching the object captured in an image at a location where existence of an object is recognized on the basis of the distance information with images in which various objects are captured. Then, the object recognition processing section 23 outputs an attribute to which the recognized object belongs (for example, names of various objects that may be disposed on the road, types of animals, and the like) as object recognition information.

On the basis of distance information supplied from the distance measuring section 21 and motion information supplied from the own vehicle motion estimating section 22, the 3D modeling section 24 generates a 3D model representing an object in the surrounding environment of the vehicle 31 in a three-dimensional shape and supplies the model to the image generating section 26. For example, the 3D modeling section 24 generates a 3D model at each timing when distance information and motion information are supplied, and in addition may use a past motion of the vehicle 31 to generate a 3D model based on the arrangement of objects estimated from the motion. That is, the 3D modeling section 24 accumulates the 3D models and estimates arrangement of obstacles on the basis of the past movement of the vehicle 31 even for the obstacles that have gone out of the angle of view (in the dead angle) of the stereo image capturing device 12, thereby reflecting the arrangement on the 3D models.

Various data necessary for image processing in the image processing device 15 are registered in the data registering section 25. For example, driver head position information indicating the position of the driver's head in the vehicle 31 (for example, the viewpoint position of the driver) is registered in the data registering section 25. For example, in the driver head position information, the position identified on the basis of the position and shape of the driver's seat of the vehicle 31 can be set in advance, and in addition, the information can be set in real time by measuring the driver's head using a sensor (not illustrated). Further, in the data registering section 25, icon images (see FIG. 8) representing attributes are registered in advance in association with attributes of the objects that can be recognized by the object recognition processing section 23.

When an obstacle is identified by the distance measuring section 21, the image generating section 26 acquires driver head position information from the data registering section 25. Then, the image generating section 26 determines a position and a posture (inclination) in which the virtual mirror 41 is virtually arranged on the basis of the position and direction of the obstacle represented by the 3D model supplied from the 3D modeling section 24 as viewed from the driver. For example, the image generating section 26 determines the position and posture such that the virtual mirror 41 is disposed at an upper location of the obstacle viewed from the drive, and at least the vehicle 31 and the obstacle can be seen by reflection from the virtual mirror 41 when viewed from the driver.

Thereafter, the image generating section 26 generates a virtual mirror image so that the vehicle 31 and the obstacle can be seen by reflection by the mirror, assuming that the mirror is virtually arranged at the determined position and posture. Then, the image generating section 26 causes the display device 14 to display a virtual mirror image such that the image is displayed at a display position at which the obstacle can be seen from the driver.

For example, the image generating section 26 can generate a virtual mirror image by applying viewpoint conversion to a stereo image captured by the stereo image capturing device 12. Further, the image generating section 26 may generate, as a virtual mirror image, a CG (Computer Graphics) image obtained by rendering the 3D model supplied from the 3D modeling section 24 in the direction in which the obstacle is viewed from the virtual mirror 41 side. Then, the generated virtual mirror image is reversed so as to be a mirror image reflected by the mirror and displayed on the display device 14.

Further, in the case where object recognition information is supplied from the object recognition processing section 23 with regard to an object identified as an obstacle within a predetermined distance, the image generating section 26 acquires the icon image registered in association with the attribute of the obstacle from the data registering section 25. Then, the image generating section 26 causes the display device 14 to display an icon image such that the display position corresponds to the position of the obstacle measured by the distance measuring section 21. For example, in the case of displaying a virtual mirror image on the display device 14, the image generating section 26 can display an icon image in the vicinity of the virtual mirror image.

Further, the image generating section 26, for example, changes the color of the virtual mirror image displayed on the display device 14 according to the distance to the obstacle indicated by the distance information supplied from the distance measuring section 21 so as to perform an alerting process that alerts the driver to the obstacle. Note that the alerting process may be performed on the basis of an auditory sense, for example, by outputting a warning sound from a speaker (not illustrated) in addition to on the basis of such a visual sense.

Incidentally, the image generating section 26 can move the display position of the virtual mirror image in accordance with the measurement of the position movement of the obstacle by the distance measuring section 21. In addition, in the case where a plurality of obstacles is identified by the distance measuring section 21, the image generating section 26 can display virtual mirror images at a plurality of locations on the display device 14 in accordance with the positions of the respective obstacles. Further, in the case where the positions of a plurality of obstacles are close to each other, the image generating section 26 can superimpose virtual mirror images corresponding to the obstacles in accordance with the distances, or can collectively display a plurality of obstacles in one large virtual mirror image.

The image display system 11 is configured as described above, and by using the virtual mirror image as described above, the driver can grasp the distance from an obstacle with a smaller visual line shift.

Figure 4:
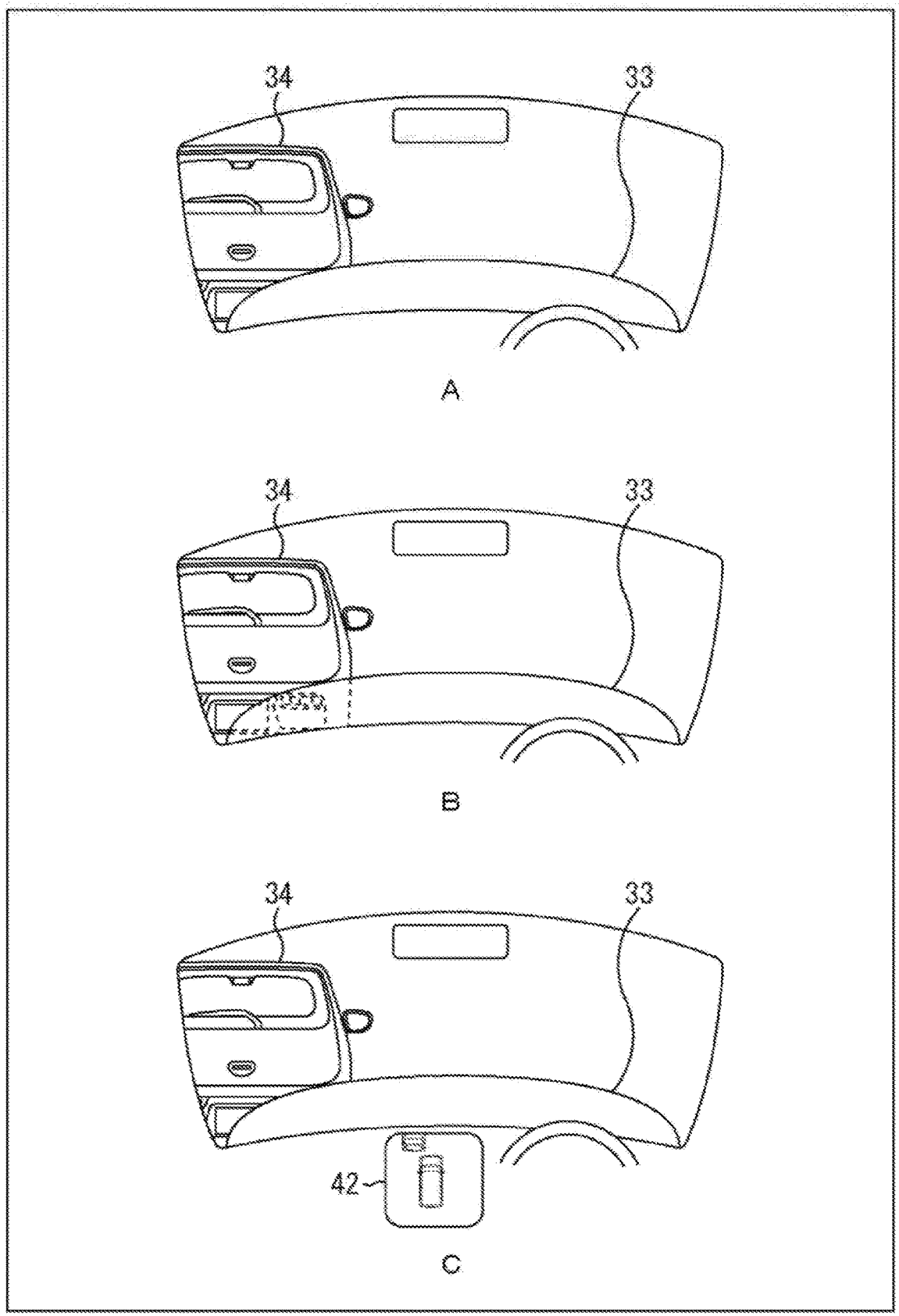
FIG. 4 depicts diagrams for explaining a field of view when other methods are used.

Here, with reference to FIGS. 2 to 4, the virtual mirror image displayed on the display device 14 in the image display system 11 will be described.

FIG. 2A illustrates a side view representing the positional relationship between the vehicle 31 on which the image display system 11 is mounted and a stopped vehicle 32 at a standstill in front of the vehicle 31, and FIG. 2B illustrates the plan view thereof. Note that, in FIG. 2, the angle of view indicating the range where images can be captured by the stereo image capturing device 12 is indicated by broken lines, and the visual line of the driver in the vehicle 31 is indicated by a dashed-dotted line.

As illustrated in FIG. 2A, it is assumed that the vehicle 31 moves forward and approaches the stopped vehicle 32 to a range that is a blind spot as viewed from the driver of the vehicle 31 (a hatched range below the dashed-dotted line). In this case, the driver of the vehicle 31 cannot visually recognize the stopped vehicle 32 in the blind spot. Incidentally, the stereo image capturing device 12 is disposed near the upper end of the windshield of the vehicle 31 and can capture the image of the stopped vehicle 32 that is in a blind spot for the driver.

Then, as illustrated in FIG. 2B, the driver of the vehicle 31 performs a steering operation so that the vehicle 31 moves toward the right side so as to avoid the stopped vehicle 32. In such a situation, the virtual mirror image is displayed by the image display system 11 in order to prevent the driver from bringing the vehicle 31 into contact with the stopped vehicle 32.

That is, as illustrated in FIG. 3A, the position and posture of the virtual mirror 41 are arranged above the location of the stopped vehicle 32 when viewed from the driver of the vehicle 31, and determined such that at least the distance between the vehicle 31 and the stopped vehicle 32 can be seen by the reflection on the virtual mirror 41. Then, the virtual mirror 41 is arranged at the position and posture determined in such a way when viewed from the driver of the vehicle 31, and a virtual mirror image that appears to be reflected by the virtual mirror 41 is displayed on the display device 14.

At this time, as illustrated in FIG. 3B, a virtual mirror image that appears to be reflected by the virtual mirror 41 is displayed on the left side of the display device 14 so that the virtual mirror 41 seems to be arranged at the location seen in the direction from the position of the driver's head in the vehicle 31 toward the stopped vehicle 32. As illustrated in the figure, viewpoint conversion is applied to the image captured by the stereo image capturing device 12, and the virtual mirror image exhibits a situation in which the distance between the vehicle 31 and the stopped vehicle 32 is viewed from above.

Therefore, the driver of the vehicle 31 can intuitively grasp the distance between the vehicle 31 and the stopped vehicle 32 by looking at the virtual mirror image displayed on the display device 14. Thereby, the driver of the vehicle 31 can drive so that the situation in which the vehicle 31 comes in contact with the stopped vehicle 32 may be avoided reliably.

As described above, for example, the image display system 11 applies the viewpoint conversion to the image captured by the stereo image capturing device 12, and generates a virtual mirror image so that the image seems to be reflected by the virtual mirror 41 virtually disposed above a position between the vehicle 31 and the stopped vehicle 32. Then, the image display system 11 displays a virtual mirror image at a display position of the display device 14 that is the location of the stopped vehicle 32 when viewed from the driver. As a result, the driver of the vehicle 31 can intuitively grasp the distance between the vehicle 31 and the stopped vehicle 32 from the virtual mirror image by viewing the virtual mirror image with a small visual line shift from the stopped vehicle 32 to which attention should be paid.

Here, with reference to FIG. 4, the field of view when the virtual mirror 41 as described with reference to FIG. 3 is not used will be described in a situation where a stopped vehicle 34 is in a standstill in front of a vehicle 33 as in the situation illustrated in FIG. 2.

For example, FIG. 4A illustrates a normal field of view in which means for confirming the blind spot is not used. In this case, the driver of the vehicle 33 cannot visually recognize the stopped vehicle 34 that is in a blind spot due to the hood of the vehicle 33.

In FIG. 4B, the field of view is illustrated in the case where the image of the area that is blinded by the hood of the vehicle 33 is displayed on a head-up display so as to be superimposed on the hood as viewed from the driver of the vehicle 33 as if the hood of the vehicle 33 were transparent. In this case, the driver of the vehicle 33 can drive the vehicle so as to avoid the stopped vehicle 34 by visually recognizing the stopped vehicle 34 from an image displayed so as to be superimposed on the hood of the vehicle 33. However, by an image that appears as if the hood of the vehicle 33 were transparent, grasping the distance between the vehicle 31 and the stopped vehicle 32 as in the virtual mirror image using the virtual mirror 41 illustrated in FIG. 3 is difficult.

Also, FIG. 4C illustrates the field of view in the case where an image that is obtained by processing captured images around the vehicle 31 and that represents a bird's eye view as seen from directly above the vehicle 31 is displayed on a display 42 provided on the dashboard of the vehicle 31. However, in this case, the driver of the vehicle 33 needs to gaze on the display 42 by taking the driver's visual line away from the stopped vehicle 34 to which attention should be paid.

In the image display system 11 in contrast with these existing methods, the virtual mirror image using the virtual mirror 41 allows the driver to grasp the distance from the obstacle with a smaller visual line shift and reliably to drive to avoid contact with the obstacle.

<First Image Display Processing>

First image display processing performed in the image display system 11 will be described with reference to FIG. 5.

For example, when the vehicle 31 is started and driving power is supplied to the image display system 11, the processing is started and a stereo image captured by the stereo image capturing device 12 and observation data made by the IMU 13 are supplied to the image processing device 15. Then, in step S11, the distance measuring section 21 determines whether or not an obstacle within a predetermined distance from the vehicle 31 has been detected on the basis of stereo images supplied from the stereo image capturing device 12. For example, the distance measuring section 21 measures the distances to all objects in the surrounding environment in the measurement target range corresponding to the angle of view of the image capturing section included in the stereo image capturing device 12, and objects whose measured distances are smaller than a predetermined distance are detected as obstacles.

In step S11, while the distance measuring section 21 determines that the obstacle has not been detected, the determination process is repeated, and in the case where the distance measuring section 21 determines that an obstacle has been detected, the processing proceeds to step S12.

In step S12, the distance measuring section 21 identifies the position of the obstacle at the shortest distance among the obstacles detected in step S11, and supplies the position information indicating the position of the obstacle and distance information indicating the distance to the obstacle to the image generating section 26.

In step S13, the image generating section 26 determines the position and posture of the virtual mirror 41 as described above with reference to FIG. 3 on the basis of the position information supplied from the distance measuring section 21 in step S12 and the driver head position information acquired from the data registering section 25.

In step S14, the image generating section 26 generates a virtual mirror image by applying viewpoint conversion to the stereo image supplied from the stereo image capturing device 12 so that the image appeared to be reflected by the virtual mirror 41 that is virtually arranged at the position and posture determined in step S13.

In step S15, the image generating section 26 performs an alerting process according to the distance to the obstacle indicated by the distance information supplied from the distance measuring section 21 in step S12. For example, the image generating section 26 alerts the driver by changing the color of the virtual mirror image generated in step S14 in accordance with the distance to the obstacle. Alternatively, the image generating section 26 may alert the driver by changing the brightness of the virtual mirror image or by blinking the virtual mirror image in accordance with the distance to the obstacle.

In step S16, the image generating section 26 causes the display device 14 to display the virtual mirror image such that a virtual mirror image subjected to alerting process in step S15 is displayed at a display position seen in the direction toward the obstacle from the position of the driver's head in the vehicle 31.

In step S17, the distance measuring section 21 determines whether or not the obstacle detected in step S11 has become farther than a predetermined distance.

In the case where the distance measuring section 21 determines in step S17 that the detected obstacle is not farther than the predetermined distance, that is, in the case where the obstacle being detected is still within the predetermined distance, the processing returns to step S12, and the virtual mirror image is continuously displayed.

On the other hand, in the case where the distance measuring section 21 determines in step S17 that the detected obstacle has become farther than the predetermined distance, the processing proceeds to step S18, and the virtual mirror image is made un-displayed. Thereafter, the processing returns to step S11, and similar processing is repeated thereafter.

Incidentally, even when an operation for stopping the function of displaying the virtual mirror image with respect to the obstacle being detected is performed while the virtual mirror image is being displayed, the processing may return to step S11 similar to the case where it is determined in step S17 that the obstacle has become farther than the predetermined distance.

As described above, the image display system 11 can generate a virtual mirror image that allows the driver to see an obstacle by reflection on the virtual mirror 41 that is virtually disposed above the obstacle by using stereo images captured by the stereo image capturing device 12 and can display the virtual mirror image at the location of the obstacle as viewed from the driver. As a result, the driver can intuitively grasp the distance from the obstacle with a smaller visual line shift.

<Second Image Display Processing>

Figure 6:
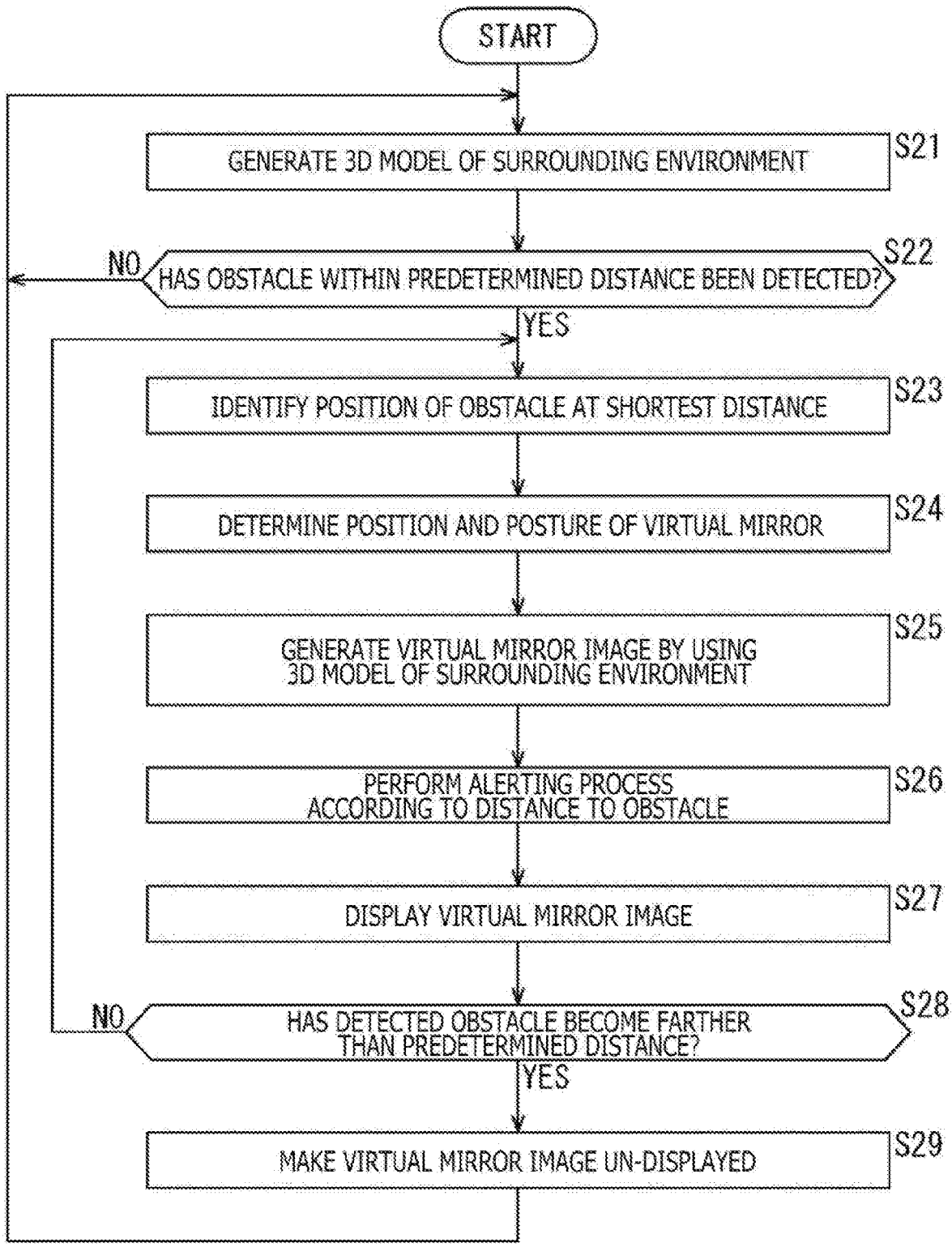
FIG. 6 is a flowchart for explaining second image display processing.

Second image display processing performed in the image display system 11 will be described with reference to FIG. 6.

For example, when the vehicle 31 is started and driving power is supplied to the image display system 11, the processing is started and stereo images captured by the stereo image capturing device 12 and observation data made by the IMU 13 are supplied to the image processing device 15. Then, in step S21, the 3D modeling section 24 generates a 3D model representing an object in the surrounding environment of the vehicle 31 by using a three-dimensional shape on the basis of distance information supplied from the distance measuring section 21 and motion information supplied from the own vehicle motion estimating section 22.

Figure 5:
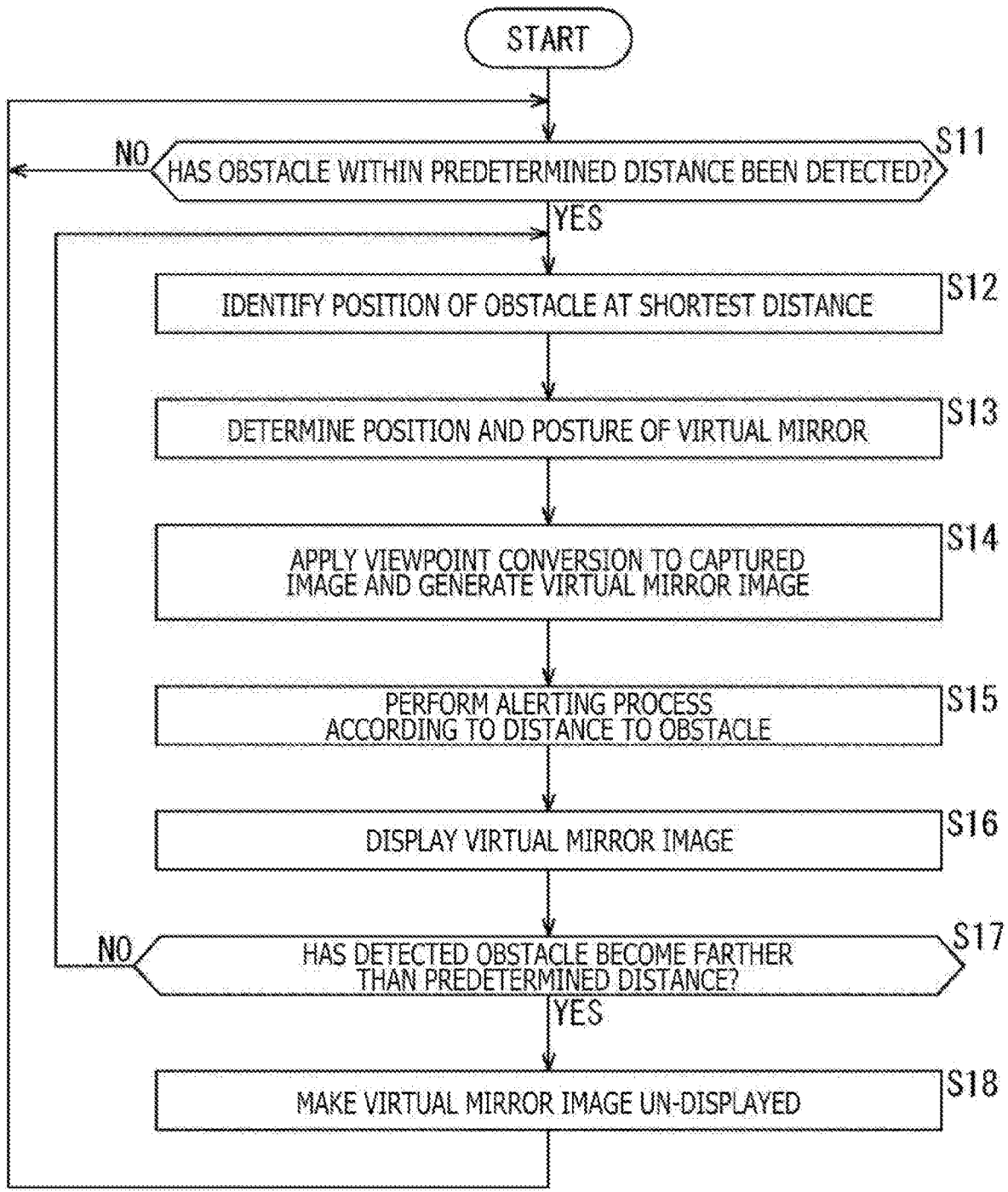
FIG. 5 is a flowchart for explaining first image display processing.

In step S22, as in step S11 in FIG. 5, the distance measuring section 21 determines whether or not an obstacle within a predetermined distance from the vehicle 31 has been detected on the basis of stereo images supplied from the stereo image capturing device 12. Then, in the case where it is determined in step S22 that no obstacle has been detected by the distance measuring section 21, the processing returns to step S21 and similar processing is repeated, and, for example, 3D models generated by the 3D modeling section 24 are accumulated.

On the other hand, in the case where it is determined in step S22 that an obstacle has been detected by the distance measuring section 21, the processing proceeds to step S23. In steps S23 and S24, processing similar to that in steps S12 and S13 in FIG. 5 is performed.

In step S25, the 3D modeling section 24 supplies the latest 3D model among the 3D models accumulated as described above to the image generating section 26. Then, the image generating section 26 uses the 3D model to generate a CG image obtained by rendering in the direction in which the obstacle is viewed from the virtual mirror 41 side as a virtual mirror image.

Thereafter, in steps S26 to S29, processing similar to that in steps S15 to S18 in FIG. 5 is performed.

As described above, the image display system 11 accumulates the 3D models generated while the vehicle 31 is traveling, and generates virtual mirror images allowing the driver to see the obstacle by the reflection on the virtual mirror 41 virtually arranged above the obstacle using the 3D models and can display the image at the location of the obstacle as viewed from the driver. As a result, the driver can intuitively grasp the distance from the obstacle with a smaller visual line shift.

<Third Image Display Processing>

Figure 7:
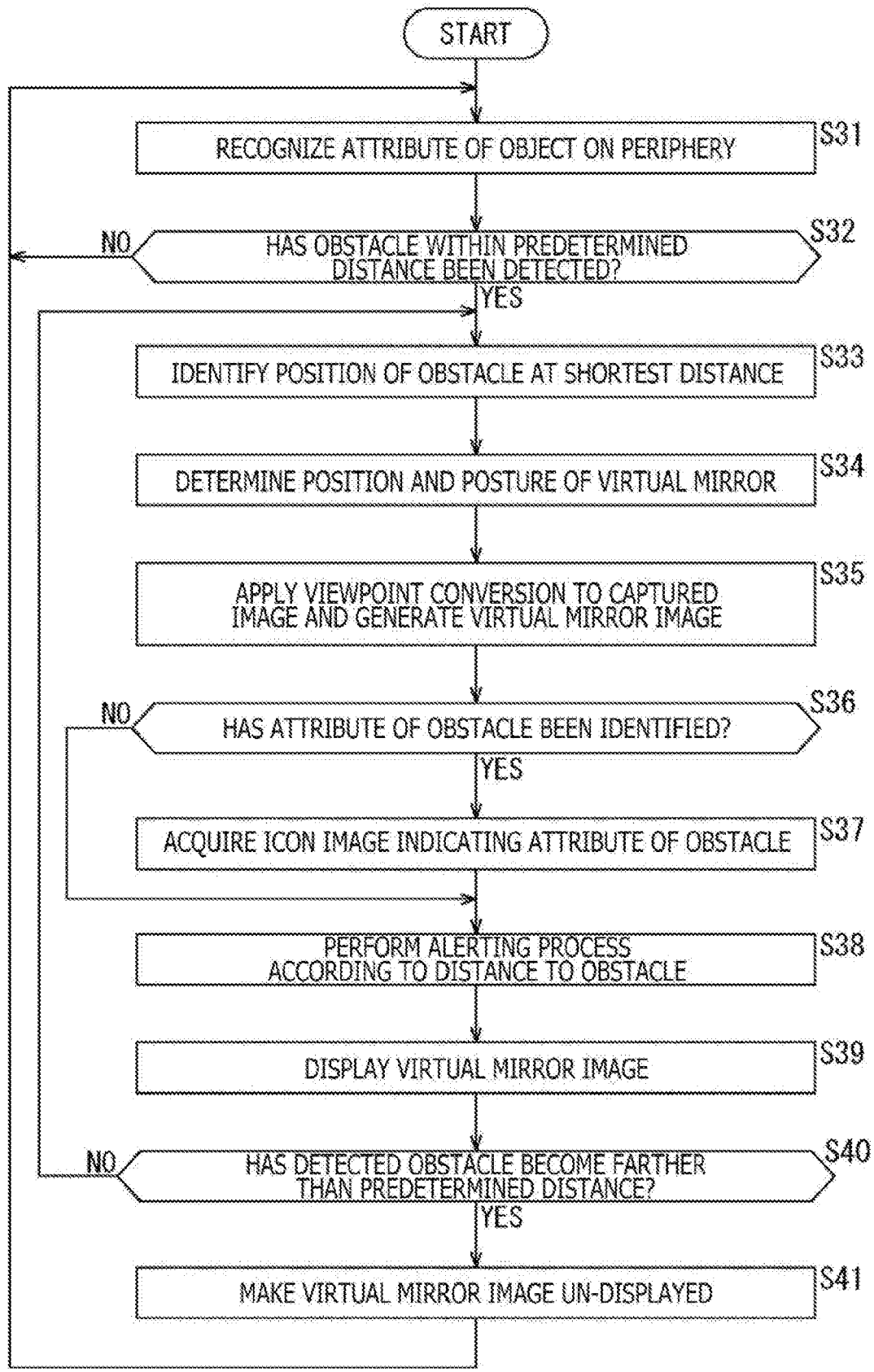
FIG. 7 is a flowchart for explaining third image display processing.

Third image display processing performed in the image display system 11 will be described with reference to FIG. 7.

For example, when the vehicle 31 is started and driving power is supplied to the image display system 11, the processing is started, and stereo images captured by the stereo image capturing device 12 and observation data made by the IMU 13 are supplied to the image processing device 15. Then, in step S31, the object recognition processing section 23 recognizes attributes of the objects in the surrounding environment of the vehicle 31 on the basis of stereo images supplied from the stereo image capturing device 12 and distance information supplied from the distance measuring section 21.

In step S32, as in step S11 of FIG. 5, the distance measuring section 21 determines whether or not an obstacle within a predetermined distance from the vehicle 31 has been detected on the basis of the stereo images supplied from the stereo image capturing device 12. Then, in the case where it is determined in step S32 that no obstacle has been detected by the distance measuring section 21, the processing returns to step S31, and similar processing is repeated, and, for example, the attributes of the objects recognized by the object recognition processing section 23 are accumulated.

On the other hand, in the case where it is determined in step S32 that the obstacle has been detected by the distance measuring section 21, the processing proceeds to step S33. In steps S33 to S35, processing similar to that in steps S12 to S14 in FIG. 5 is performed.

In step S36, the image generating section 26 determines whether or not the object recognition processing section 23 has identified the attribute of the obstacle displayed by the virtual mirror image generated in step S35. For example, in the case where the object recognition information corresponding to the obstacle displayed in the virtual mirror image is supplied from the object recognition processing section 23, it is determined that the attribute of the obstacle has been identified.

In step S36, in the case where the image generating section 26 determines that the attribute of the obstacle has been identified by the object recognition processing section 23, the processing proceeds to step S37. In step S37, the image generating section 26 acquires from the data registering section 25 the icon image registered in association with the attribute of the obstacle indicated by the object recognition information supplied from the object recognition processing section 23, and then the processing proceeds to step S38.

On the other hand, in the case where the image generating section 26 determines in step S36 that the attribute of the obstacle has not been identified by the object recognition processing section 23, the processing skips step S37 and proceeds to step S38.

In step S38, processing similar to that in step S15 in FIG. 5 is performed.

In step S39, the image generating section 26 causes the display device 14 to display the virtual mirror image so as to display the virtual mirror image subjected to the alerting process in step S15 at a display position that is the location seen in the direction from the position of the driver's head in the vehicle 31 toward the obstacle. At this time, in the case where the image generating section 26 has acquired an icon image in step S37, the image generating section 26 displays the icon image in the vicinity of the virtual mirror image.

Thereafter, in steps S40 and S41, processing similar to that in steps S17 and S18 in FIG. 5 is performed.

As described above, the image display system 11 displays the virtual mirror image at the location of the obstacle as viewed from the driver, and can display icon images based on the object recognition information made while the vehicle 31 is traveling, in the vicinity of the virtual mirror image. Thus, the driver can intuitively grasp the distance from the obstacle with a smaller visual line shift and can easily recognize what the obstacle is.

<Display Example of Icon Image>

Display examples of icon images will be described with reference to FIG. 8.

As described above, the image display system 11 can display an icon image in the vicinity of the virtual mirror image. In addition, as illustrated in FIG. 8A, the image display system 11 may display only an icon image 51 without displaying the virtual mirror image.

For example, when generating a virtual mirror image by applying viewpoint conversion to a stereo image captured by the stereo image capturing device 12, the obstacle may be outside the angle of view of the stereo image capturing device 12 due to the movement of the vehicle 31. At this time, the position of the obstacle can be estimated from the motion of the vehicle 31, and even if the image of the obstacle cannot be captured by the stereo image capturing device 12, the icon image 51 representing the attribute of the obstacle can be displayed on the basis of the estimated position of the obstacle.

In addition, the position of the obstacle relatively changes according to the movement of the vehicle 31, and in this case, the change in the position of the obstacle is estimated and the display position of the icon image 51 can be moved as illustrated in FIG. 8B in accordance with the estimated position. This can allow the driver to recognize the obstacle outside the angle of view of the stereo image capturing device 12.

Incidentally, in the present embodiment, the virtual mirror image is generated using the stereo image captured by the stereo image capturing device 12, but an image capturing device other than the stereo image capturing device 12 may be provided to generate a virtual mirror image by using images captured by this image capturing device. For example, a large number of image capturing sections can be provided at a plurality of locations such as bumpers and side mirrors of the vehicle 31 so that blind spots are not generated as much as possible, and images captured by these image capturing sections can be used. Further, in addition to measuring the distance on the basis of the stereo image captured by the stereo image capturing device 12, the distance may be measured using various sensors capable of measuring the distances, such as a TOF (Time Of Flight) sensor.

Furthermore, the measurement target range in the image display system 11 is not limited to the application to the front of the vehicle 31 as described above, and then applicable to the side or the rear of the vehicle 31, for example. That is, a virtual mirror image for recognizing an obstacle hidden in a blind spot on the rear side may be displayed by using an image capturing device that can capture images behind the vehicle 31 and a display that is arranged so as to be laid on the rear window of the vehicle 31. Further, the image display system 11 may be applied to any moving object other than the vehicle 31.

<Configuration Example of Computer>

Note that the processes described with reference to the flowcharts described above do not necessarily have to be processed in the chronological order described in the flowcharts, and includes processes that are performed in parallel or individually (for example, parallel processes or processes depending on objects). Further, the program may be processed by a single CPU, or may be distributedly processed by a plurality of CPUs.

Further, the above-described series of processing (image processing method) can be executed by hardware or can be executed by software. In the case where a series of processing is executed by software, a program constituting the software is installed from a program recording medium on which the program is recorded in a computer incorporated in dedicated hardware or, for example, in a general-purpose personal computer that can execute various functions by installing various programs.

Figure 9:
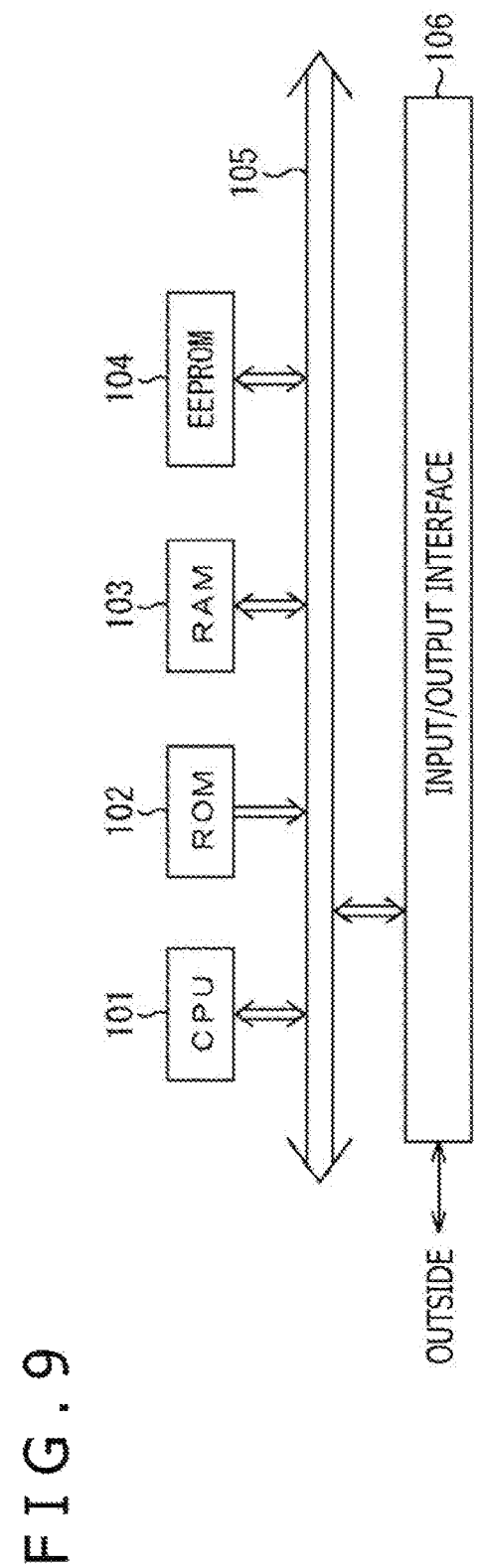
FIG. 9 is a block diagram illustrating a configuration example of an embodiment of a computer to which the present technology is applied.

FIG. 9 is a block diagram illustrating a hardware configuration example of a computer that executes the above-described series of processing by a program.

In the computer, a CPU (Central Processing Unit) 101, a ROM (Read Only Memory) 102, a RAM (Random Access Memory) 103, and an EEPROM (Electronically Erasable and Programmable Read Only Memory) 104 are connected to one another by a bus 105. An input/output interface 106 is further connected to the bus 105, and the input/output interface 106 is connected to the outside.

In the computer configured as described above, the CPU 101 loads a program stored in the ROM 102 and the EEPROM 104 into the RAM 103 via the bus 105 and executes the program, for example, thereby performing the above-described series of processing. In addition, a program executed by the computer (CPU 101) can be installed in the EEPROM 104 or updated from the outside via the input/output interface 106 in addition to being written in the ROM 102 in advance.

<Combination Example of Configuration>

In addition, the present technology can also employ the following structures.

(1)
An image processing device including:
a distance measuring section that measures a distance from a predetermined moving object to another object in a measurement target range and identifies the another object within a predetermined distance as an obstacle; and
an image generating section that generates a virtual mirror image such that at least the moving object and the obstacle are visible by reflection of a mirror, in a case where the mirror is assumed to be virtually disposed above a location of the obstacle viewed from a predetermined viewpoint position in the moving object and causes a display device arranged to cover at least a part of the measurement target range as viewed from the viewpoint position to display the virtual mirror image.

(2)
The image processing device described in the above item (1), in which
the image generating section displays the virtual mirror image at a display position at which the obstacle is visible from the viewpoint position.

(3)
The image processing device described in the above item (1) or (2), in which
the image generating section generates the virtual mirror image by applying viewpoint conversion to an image captured from a position higher than the viewpoint position by an image capturing device that captures an image with the measurement target range as an angle of view.

(4)
The image processing device described in the above item (3), further including:
an object recognition processing section that recognizes an attribute of the obstacle identified by the distance measuring section on the basis of the image captured by the image capturing device, in which
the image generating section causes the display device to display an image indicating the attribute of the obstacle in accordance with the position of the obstacle.

(5)
The image processing device described in any one of the above items (1) to (4), further including:
a 3D modeling section that generates a 3D model representing the another object in a surrounding environment of the moving object including at least the measurement target range in a three-dimensional shape, in which
the image generating section determines a position and a posture of the mirror virtually arranged such that at least the moving object and the obstacle are capable of being viewed due to the virtual mirror image from the viewpoint position, on the basis of the 3D model.

(6)
The image processing device described in the above item (5), in which
the image generating section uses the 3D model to generate the virtual mirror image by performing rendering in a direction of a position between the moving object and the obstacle as viewed from the virtually arranged mirror side.

(7)
The image processing device described in the above item (5) or (6), further including:
a motion estimating section for estimating a motion of the moving object, in which
the 3D modeling section generates the 3D model on the basis of the motion of the moving object estimated by the motion estimating section and the distance to the another object measured by the distance measuring section.

(8)
The image processing device described in the above item (7), in which
the 3D modeling section accumulates the generated 3D model, and estimates the position of the obstacle that has entered a blind spot where the distance is not capable of being measured by the distance measuring section in accordance with the motion of the moving object estimated by the motion estimating section to generate the 3D model.

(9)
The image processing device described in any one of the above items (1) to (8), further including:
a stereo image capturing unit that includes at least two image capturing sections that capture images with the measurement target range as an angle of view, and that captures a stereo image having parallax by using the image capturing sections, in which
the distance measuring section measures a distance to the another object by using the stereo image.

(10)
The image processing device described in any one of the above items (1) to (9), in which
an alerting process of alert against the obstacle is performed in accordance with the distance to the obstacle measured by the distance measuring section.

(11)
The image processing device described in the above item (10), in which
the alerting process is performed by changing a color of the virtual mirror image.

(12)
The image processing device according to any one of the above items (1) to (11), in which
the image generating section moves a display position of the virtual mirror image in accordance with measurement of a position shift of the obstacle by the distance measuring section.

(13)
The image processing device described in any one of the above items (1) to (12), in which
in a case where the distance measuring section identifies a plurality of the obstacles, the image generating section causes the virtual mirror image to be displayed at each of a plurality of locations in accordance with a position of each of the obstacles.

(14)
An image processing method including the steps of:
measuring a distance from a predetermined moving object to another object in a measurement target range so as to identify the another object within a predetermined distance as an obstacle; and
generating a virtual mirror image such that at least the moving object and the obstacle are visible by reflection of a mirror, in a case where the mirror is assumed to be virtually arranged above a location of the obstacle viewed from a predetermined viewpoint position in the moving object so as to cause a display device arranged to cover at least a part of the measurement target range as viewed from the viewpoint position to display the virtual mirror image.

(15)
An image display system including:
a stereo image capturing device that captures a stereo image with a measurement target range from a predetermined moving object as an angle of view;
a display device arranged to cover at least a part of the measurement target range as viewed from a predetermined viewpoint position in the moving object;

a distance measuring section that measures a distance to another object in the measurement target range by using the stereo image, and identifies the another object within a predetermined distance as an obstacle; and an image generating section that generates a virtual mirror image such that at least the moving object and the obstacle are visible by reflection of a mirror, in a case where the mirror is assumed to be virtually arranged above a location of the obstacle viewed from the predetermined viewpoint position in the moving object and causes the display device to display the virtual mirror image.

Note that the present embodiment is not limited to the above-described embodiment, and various modifications can be made without departing from the scope of the present disclosure. Moreover, since the effects described in the present specification are only illustrations, the effects of the present disclosure are not limited thereto, and thus there may exist other effects.

REFERENCE SIGNS LIST

11 Image display system, 12 Stereo image capturing device, 13 IMU, 14 Display device, 15 Image processing device, 21 Distance measuring section, 22 Own vehicle motion estimating section, 23 Object recognition processing section, 24 3D modeling section, 25 Data registering section, 26 Image generating section, 31 Vehicle, 32 Stopped vehicle, 33 Vehicle, 34 Stopped vehicle, 41 Virtual mirror, 42 Display, 51 Icon image

The invention claimed is:

1. An image processing device comprising:
circuitry configured to
measure a distance from a moving object to another object in a measurement target range and identifies the other object within a predetermined distance as an obstacle, at least a part of the obstacle being in a blind spot from a viewpoint position of a driver of the moving object; and
generate a virtual mirror image such that at least the moving object and the obstacle are visible by reflection of a mirror, in a case where the mirror is assumed to be virtually disposed above a location of the obstacle viewed from the viewpoint position of the driver of the moving object and causes a display device arranged to cover at least a part of the measurement target range as viewed from the viewpoint position to display the virtual mirror image,
wherein the virtual mirror image is an image that provides visual information indicating the distance between the moving object and the obstacle to the driver of the moving object,
wherein the circuitry causes the display device to display the virtual mirror image at a display position at which at least the part of the obstacle is visible from the viewpoint position on a display screen in a superimposed way by the display device, to prevent causing a visual line of the driver of the moving object from shift which exceeds a predetermined amount on the display screen.

2. The image processing device according to claim 1, wherein
the circuitry generates the virtual mirror image by applying viewpoint conversion to an image captured from a position higher than the viewpoint position by an image capturing device that captures an image with the measurement target range as an angle of view.

3. The image processing device according to claim 2, the circuitry is further configured to:
recognize an attribute of the obstacle on a basis of the image captured by the image capturing device, wherein
the circuitry causes the display device to display an icon image indicating the attribute of the obstacle in accordance with the position of the obstacle.

4. The image processing device according to claim 1, the circuitry is further configured to:
generate a 3D model representing the other object in a surrounding environment of the moving object including at least the measurement target range in a three-dimensional shape, wherein
the circuitry determines a position and a posture of the mirror virtually arranged such that at least the moving object and the obstacle are capable of being viewed due to the virtual mirror image from the viewpoint position, on a basis of the 3D model.

5. The image processing device according to claim 4, wherein
the circuitry uses the 3D model to generate the virtual mirror image by performing rendering in a direction of a position between the moving object and the obstacle as viewed from the virtually arranged mirror side.

6. The image processing device according to claim 4, the circuitry is further configured to:
estimate a motion of the moving object, wherein
the circuitry generates the 3D model, on a basis of the estimated motion of the moving object and the distance to the other object.

7. The image processing device according to claim 6, wherein
the circuitry accumulates the generated 3D model, and estimates the position of the obstacle that has entered the blind spot where the distance is not capable of being measured in accordance with the estimated motion of the moving object to generate the 3D model.

8. The image processing device according to claim 1, further comprising:
a stereo image capturing unit that includes at least two image capturing sections that capture images with the measurement target range as an angle of view, and that captures a stereo image having parallax by using the image capturing sections, wherein
the circuitry measures a distance to the other object by using the stereo image.

9. The image processing device according to claim 1, wherein
an alerting process of alert against the obstacle is performed in accordance with the distance to the obstacle.

10. The image processing device according to claim 9, wherein
the alerting process is performed by changing a color of the virtual mirror image.

11. The image processing device according to claim 1, wherein
the circuitry moves the display position of the virtual mirror image in accordance with measurement of a position shift of the obstacle.

12. The image processing device according to claim 1, wherein
in a case where the circuitry identifies a plurality of the obstacles, the circuitry causes the virtual mirror image to be displayed at each of a plurality of locations in accordance with a position of each of the obstacles.

13. An image processing method for an image processing device for processing an image, the method comprising:

measuring a distance from a moving object to another object in a measurement target range so as to identify the other object within a predetermined distance as an obstacle, at least a part of the obstacle being in a blind spot from a viewpoint position of a driver of the moving object; and generating a virtual mirror image such that at least the moving object and the obstacle are visible by reflection of a mirror, in a case where the mirror is assumed to be virtually arranged above a location of the obstacle viewed from the viewpoint position of the driver of the moving object and causes a display device arranged to cover at least a part of the measurement target range as viewed from the viewpoint position to display the virtual mirror image, wherein the virtual mirror image is an image that provides visual information indicating the distance between the moving object and the obstacle to the driver of the moving object, wherein, causing the display device to display the virtual mirror image at a display position at which at least the part of the obstacle is visible from the viewpoint position on a display screen in a superimposed way by the display device, to prevent causing a visual line of the driver of the moving object from shift which exceeds a predetermined amount on the display screen.

14. An image display system comprising:

a stereo image capturing device that captures a stereo image with a measurement target range from a moving object as an angle of view; a display device arranged to cover at least a part of the measurement target range as viewed from a viewpoint position in the moving object; and circuitry configured to measure a distance to another object in the measurement target range by using the stereo image, and identifies the other object within a predetermined distance as an obstacle, at least a part of the obstacle being in a blind spot from the viewpoint position of a driver of the moving object; and generate a virtual mirror image such that at least the moving object and the obstacle are visible by reflection of a mirror, in a case where the mirror is assumed to be virtually arranged above a location of the obstacle viewed from the viewpoint position of the driver of the moving object and causes the display device to display the virtual mirror image, wherein the virtual mirror image is an image that provides visual information indicating the distance between the moving object and the obstacle to the driver of the moving object, wherein the circuitry causes the display device to display the virtual mirror image at a display position at which at least the part of the obstacle is visible from the viewpoint position on a display screen in a superimposed way by the display device, to prevent causing a visual line of the driver of the moving object from shift which exceeds a predetermined amount on the display screen.

* * * * *